Patented July 27, 1937

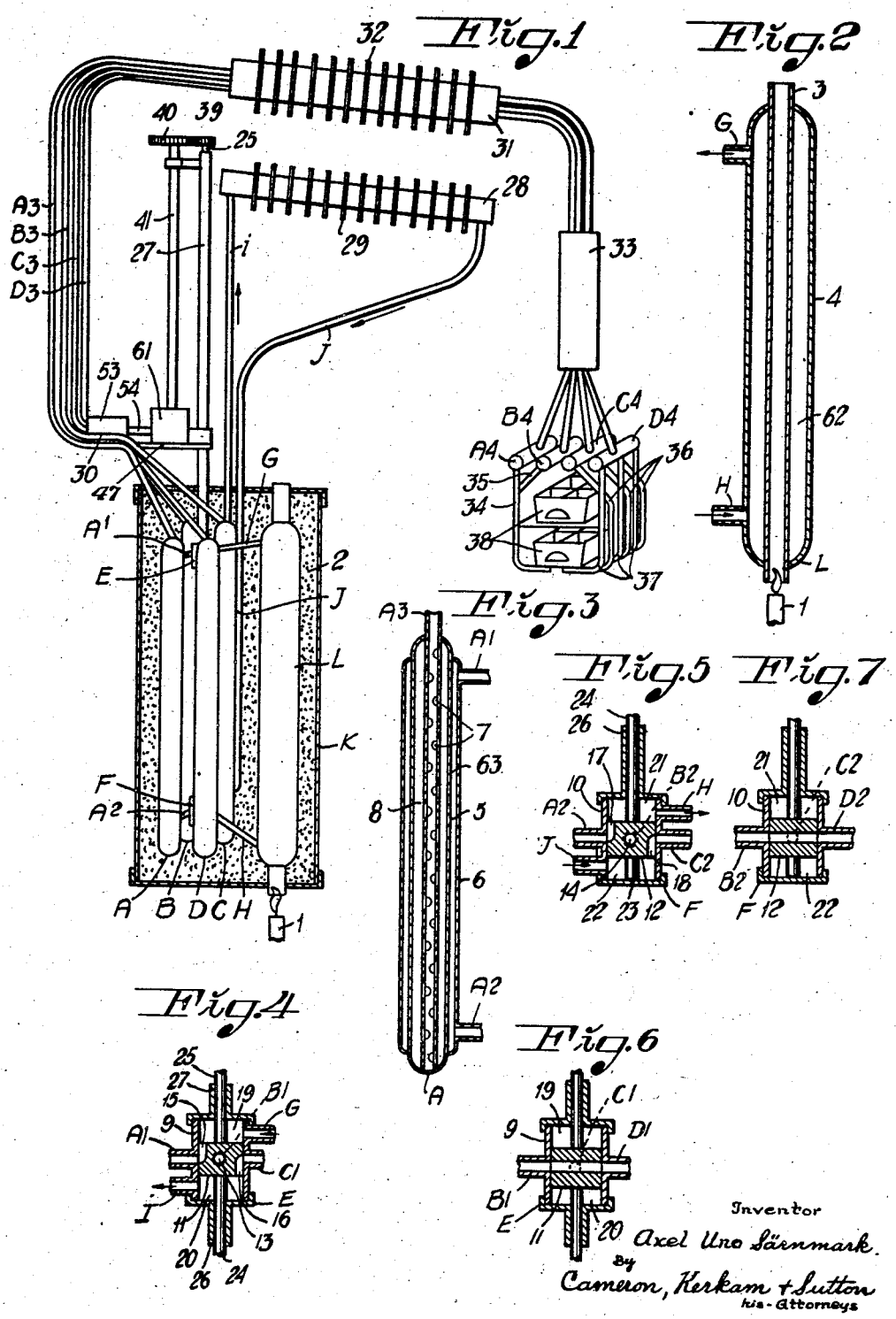

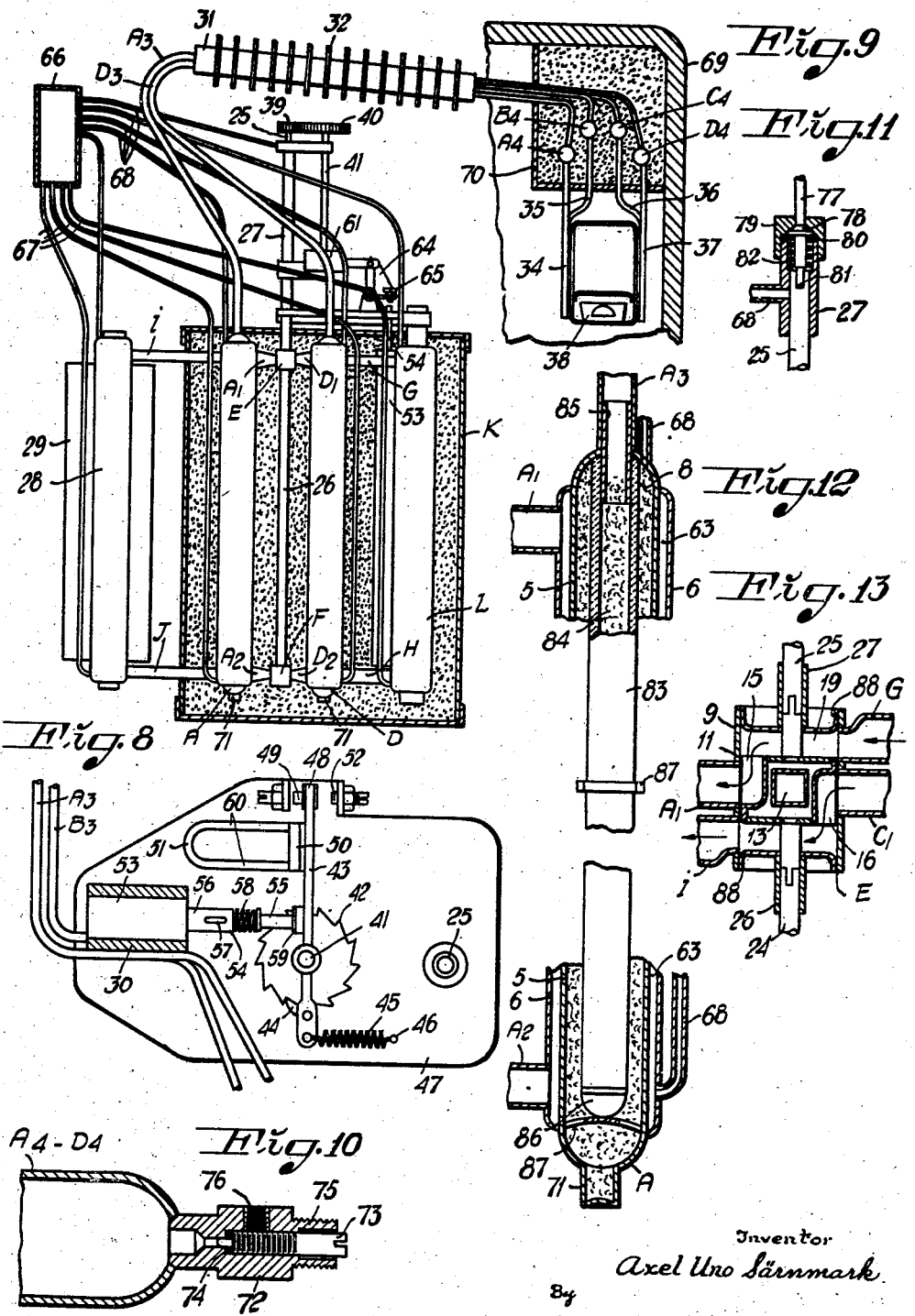

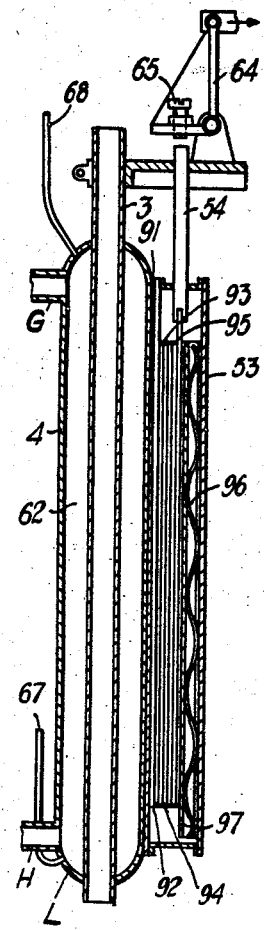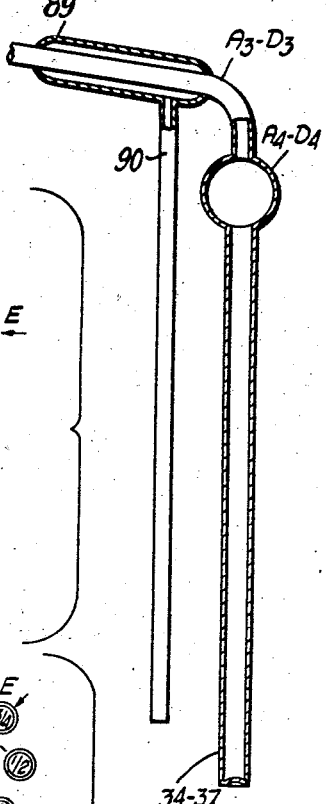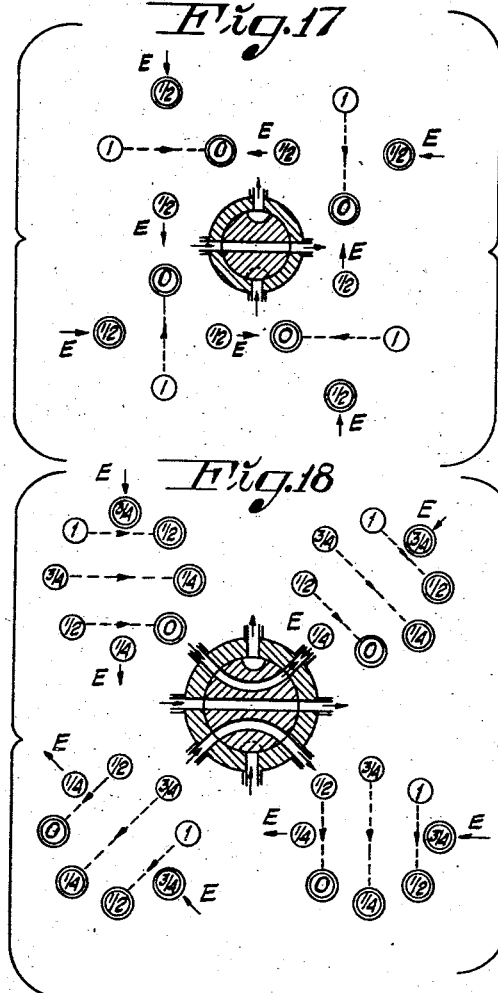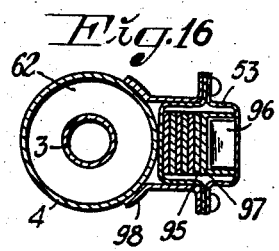

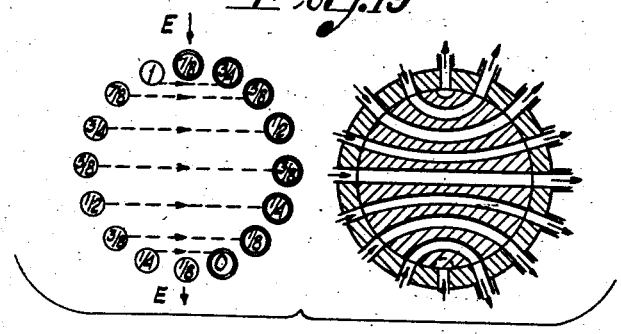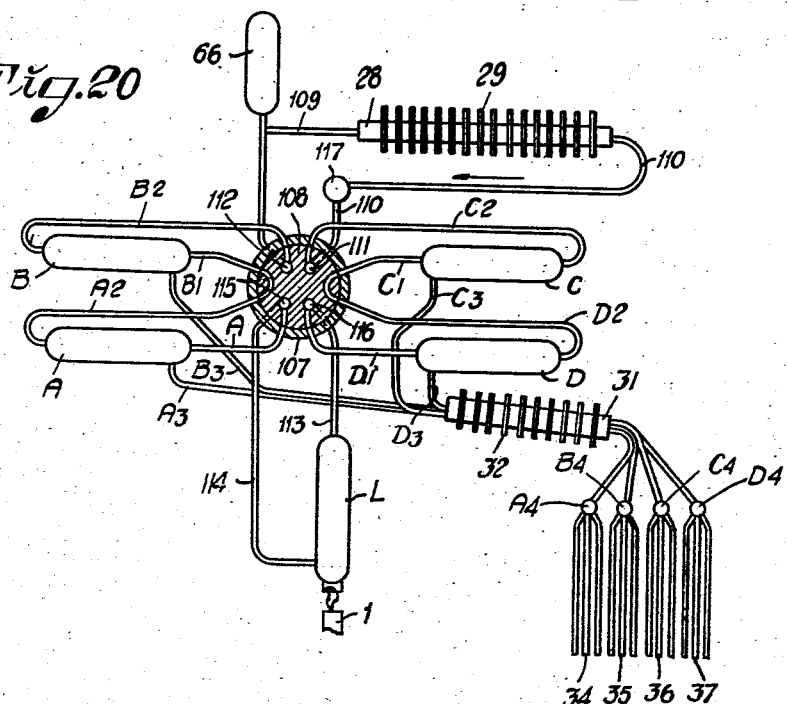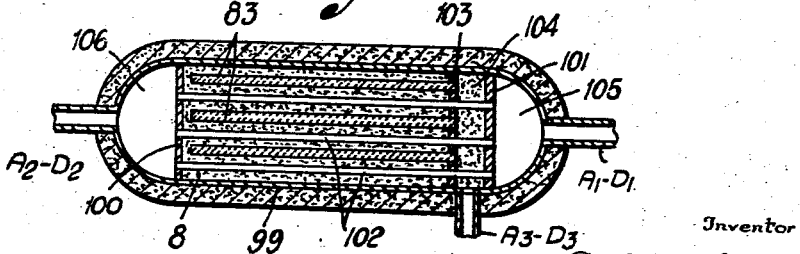

2,087,939

UNITED STATES PATENT OFFICE 2,087,939

PROCESS FOR PRODUCING COLD AND CONTINUOUSLY OPERATING ABSORPTION COLD APPARATUS

Axel Uno Särnmark, Gothenburg, Sweden

Application August 24, 1934, Serial No. 741,350
In Sweden August 28, 1933

32 Claims. (Cl. 62—118)

Absorption refrigerating apparatus hitherto known, all suffer from the disadvantage of operating at a very low efficiency. In continuously operating apparatus of this type, which as a rule operate by means of a pressure equalizing inert gas, it cannot be avoided that hot gaseous mixture is transferred from the absorber to the refrigerator. It may be that precoolers or heat exchangers may be provided for the cold gaseous mixture flowing from the refrigerator and the hot gaseous mixture passing into same, but a certain loss of cold will always take place resulting in a reduction of the efficiency. In intermittently operating apparatus the refrigerant vapours are expelled from one or more generators to one or more refrigerators. During the period of expulsion the generator or generators should be insulated but during the period of absorption cooling of same should take place. As a rule the generator or generators have not been insulated during the period of expulsion causing great losses due to heat radiation from same. Consequently, the intermittently operating apparatus also have had a low efficiency.

The present invention relates to continuously operating refrigerating apparatus of a new type in which a considerably higher efficiency can be obtained than in any system previously known. A calculation shows that the efficiency of the new system may be four to six times higher than in other systems and in certain cases still higher depending on the arrangement. Evidently, this means that for a given cold output the costs of operation will be correspondingly lower. The system may advantageously be used for varying outputs, e. g. for the production of cold in so called domestic refrigerators, or in industries of different kinds up to the high amounts of refrigerating capacities required for cooling large rooms or buildings. The invention relates to refrigerating apparatus of the kind in which refrigerant vapours evaporated in the refrigerator are transferred to and absorbed in suitable liquid and/or solid absorption medium due to super-pressure created in said refrigerator.

According to the invention, the apparatus contains two or more absorption or expulsion elements and/or periodical cooling systems adapted to be connected with each other in such a manner that the heat of absorption in one or more elements or systems is directly and/or indirectly utilized for the heating of or expulsion of refrigerant from one or more other elements or systems. The invention is further characterized by the fact that said two or more absorption or expulsion elements and/or periodical systems are adapted to be connected with each other in such a manner that an element or system in which expulsion of refrigerant takes place will cool an element or system in which refrigerant vapours are absorbed.

In the accompanying drawings, wherein like reference characters indicate like parts throughout the several views:

Fig. 1 is a diagrammatic view, partially in section, of one form of refrigerating apparatus embodying the invention;

Fig. 2 is a longitudinal sectional view of the heat source or distributor of the apparatus of Fig. 1;

Fig. 3 is a longitudinal sectional view of one of the generator-absorber elements of Fig. 1;

Figs. 4 and 5 are longitudinal sectional views of the upper and lower portions, respectively, of the change over or valve member of Fig. 1 which controls the flow of fluid in the conduits connecting the generator-absorber elements and the heat source or distributor;

Figs. 6 and 7 are longitudinal sectional views of the change over or valve member of Fig. 1 taken on a plane at right angles to that on which Figs. 4 and 5 are taken;

Fig. 8 is a diagrammatic plan view of the thermostatically actuated mechanism for operating the change over or valve member of Figs. 1 and 4–7;

Fig. 9 is a diagrammatic view, partially in section, of another refrigerating apparatus embodying the invention;

Fig. 10 is a fragmentary sectional view illustrating the construction of the filling valve located at the lower end of each of the generator-absorber elements of Fig. 9;

Fig. 11 is a fragmentary sectional view illustrating the details of construction of the upper end of the valve operating shaft of Fig. 9;

Fig. 12 is an elevational view, partially in section and partially broken away, of one of the generator-absorber elements of Fig. 9;

Fig. 13 is a longitudinal sectional view of the upper portion of the change over or valve member of Fig. 9;

Fig. 14 is an elevational view, partially in section, of an arrangement by which part of the heat contained in the vapours of the refrigerant escaping from the refrigerator of Fig. 9 may be returned to the interior of the space to be cooled;

Fig. 15 is a longitudinal sectional view of the heat source or distributor of Fig. 9 illustrating the details of the thermostatic control for the valve operating mechanism;

Fig. 16 is a cross sectional view of the heat source and thermostatic control of Fig. 15;

Figs. 17–19, inclusive, are diagrammatic views illustrating the connections between the different elements of apparatus according to the invention during different stages of operation when using four or more generator-absorber elements;

Fig. 20 is a diagrammatic view, partially in section, of still another refrigerating apparatus embodying the invention; and Fig. 21 is a longitudinal sectional view of another form of generator-absorber element especially adapted for use in large refrigerating plants.

With reference to Fig. 1 reference letter K designates a generator containing a heat distributor L and four absorption or expulsion elements A, B, C and D referred to as elements in the following description. As seen in Figs. 1 to 7 the elements are at their upper and lower ends connected with change over devices E and F by means of conduits A1, B1, C1, D1 and A2, B2, C2, D2, respectively. The heat distributor L, which is permanently heated by any suitable heat source, e. g., a gas flame, an electric heater or the like as shown at 1, is connected with the change over devices E and F by means of conduits G and H. The generator as a whole is surrounded by heat insulating material 2, e. g. infusorial earth, magnesia or the like.

Figs. 2 to 7 are detailed views of the distributor L, elements A, B, C and D and change over devices E and F. In the embodiment of the heat distributor L shown in Fig. 2 reference numeral 3 designates a heat channel and 4 a tubular shell surrounding said channel. All elements A, B, C and D are of similar construction, one of same, viz. A, being illustrated in Fig. 3. In this figure 5 is a receptacle surrounded by a shell 6 closed at its upper and lower end, the above-said conduits A1 and A2 being connected to said shell. Extending into and throughout the length of the receptacle 5 is a conduit A3 provided in its portion situated within the receptacle with a plurality of holes 7. Preferably the portion of the conduit A3 situated within the receptacle 5 is filled by a porous material, e. g. iron wool. Between the conduit A3 and the wall of the receptacle 5 the latter is filled by a solid absorption medium 8, e. g. calcium chloride. The absorption medium should make good contact with the wall of the receptacle this being effected by said medium swelling, when the apparatus is charged by the refrigerant, preferably consisting of ammonia.

Figs. 4 to 7 are sectional views of the change over devices E and F, Figs. 6 and 7 showing views taken perpendicular to those of Figs. 4 and 5. The change over devices E and F are of similar construction and operation. 9 and 10 designate valve housings and 11 and 12 members rotatably mounted in said housings. Holes 13 and 14 are provided in the rotary members 11 and 12 in the one direction thereof, and perpendicular to said direction the members are formed with recesses 15, 16 and 17, 18, respectively. Provided on opposite sides of the rotary members are open spaces 19, 20 and 21, 22, respectively. The lower rotary member 12 rests on a point 23, and the members 11 and 12 are connected with each other by means of a shaft 24. The upper rotary member 11 is connected with a shaft 25 permitting rotation of said member as well as member 12. The change over devices E and F communicate with each other by means of a pipe conduit 26 surrounding the shaft 24 with a tight fit, and extending from the upper change over device is a pipe conduit 27 surrounding the shaft 25.

The conduits A1, B1, C1 and D1 (see Figs. 5 to 7) are connected with the upper portions of the shells 6 of the elements A, B, C and D, and in similar manner the conduits A2, B2, C2 and D2 are connected with the lower portions of the shells 6 of said elements. The conduits I and J (see Figs. 1 and 5 to 7) are connected with a cooling element 28 provided with cooling ribs 29. The length of the conduit 27 is such that its upper orifice is situated at a level higher than the highest point of the cooling element 28. Extending from the upper end of the elements A, B, C and D are pipe conduits A3, B3, C3 and D3 disposed close to each other immediately above the generator K in thermal contact with a copper sleeve 30 (see Figs. 1 and 8). The conduits A3, B3, C3 and D3 extend through a cooling element 31 provided with cooling ribs 32, the conduits being disposed in good thermal contact with said cooling element either by being directly connected with same, e. g. by soldering or by the cooling element 31 being filled by a heat transmitting liquid. After having passed through the cooling element 31 the conduits A3 to D3, inclusive, are again disposed in good thermal contact with each other and preferably surrounded by an insulation 33, the latter good thermal contact between the conduits A3 to D3, inclusive, being preferably attained by passing same through a closed pipe arranged within the insulation 33 and preferably filled by a heat transmitting liquid. The conduits A3 to D3, inclusive, open into tubular receptacles A4, B4, C4 and D4, which receptacles may be replaced by one receptacle divided into four spaces. Extending from the receptacles or spaces A4 to D4, inclusive, are a plurality of pipe conduits 34, 35, 36 and 37 forming together a closed space in which ice boxes 38 may be placed. The receptacles A4 to D4, inclusive, and the conduits 34 to 37, inclusive, form together a so called refrigerator to be placed in the room to be cooled.

At its upper end the shaft 25 carries a pinion or the like 39 engaging a larger toothed wheel 40 connected to a shaft 41 which in turn carries at its lower end a ratchet wheel 42 (see Fig. 8). Freely mounted on the shaft 41 is a lever 43 carrying at its one end a pawl 44 pressed against the ratchet wheel by means of a spring. By means of a spring 45 secured to the base plate 47 as at 46, the other end 48 of the lever 43 is pressed against an adjustable stop 49. Secured to the lever 43 is an iron armature 50 which may be attracted by a magnet 51. When the armature 50 is released from the magnet 51 the end 48 of lever 43 may move from the stop 49 to an opposite adjustable stop 52. The sleeve 30, which may consist of any other suitable heat conducting material in addition to copper, surrounds a thermostat 53 provided with a movable member 54 in which another movable member 55 is mounted. The member 55 carries a stop pin 56 movable in a lengthened opening 57 between two limiting positions. A spring 58 keeps the member 55 permanently in its one end position. The member 55 is situated opposite an abutment 59 connected to the lever 43. By means of lengthened holes and screws 60 the magnet 51 is adjustably mounted on the base plate 47 which is surrounded by a protecting cap 61 (see Fig. 1). As previously stated the elements A, B, C and D are filled by a suitable solid absorption medium, e. g., calcium chloride, and the receptacles A4 to D4, inclusive, conduits 34 to 37, inclusive and the absorption medium in the elements are to a suitable degree filled by a refrigerant, e. g. ammonia.

The space 62 in the heat distributor L, spaces 63 between the receptacles 5 and the shells 6 of the elements A, B, C and D (see Figs. 2 and 3), conduits appurtenant to the elements, change over devices E and F, pipe 27, conduits I and J and cooling element 28 are filled by an easily fluid liquid having a high boiling point, e. g., a thin oil. Evidently, the oil may be replaced by any other suitable organic substance. Instead of oil or organic substance one may also use a non-freezable liquid, e. g. water having an addition of calcium chloride.

The operation of the apparatus is as follows:

At the beginning, the change over devices E and F are assumed to occupy the position shown in Figs. 4 to 7. In this position the heat distributor L is coupled to the element A by means of the conduits G, A1, A2 and H. By means of the heat source 1 the liquid in the intermediate space 62 of the heat distributor L will be heated, thereby decreasing in weight and ascending through conduit G to space 19 in the change over device E and thence through recess 15 and conduit A1 into space 63 of the element A. The hot liquid gives off its heat through the receptacle 5 to the refrigerant contained in the absorption medium 8 causing expulsion of said refrigerant. On account of the said heat transfer causing refrigerant expulsion the specific weight of the liquid flowing in space 63 will be increased resulting in said liquid descending through conduit A2 and recess 17 in the change over member F into space 21 in said member F and thence through conduit H back to space 62 in the heat distributor L where the liquid is again heated and ascends and so on.

Consequently, the heat from the heat source is by liquid circulation transmitted from the heat distributor L to the element A causing expulsion of refrigerant from said element. The refrigerant vapours expelled from the element A escape through the holes 7 into the pipe conduit A3 causing the copper sleeve 30 to be heated and thence through the cooling element 31 where the vapours are condensed into liquid refrigerant. The liquid refrigerant flows further through conduit A3 giving off its heat to conduits B3 to D3, inclusive, due to the thermal contact with said conduits. Thence the liquid refrigerant enters and fills the receptacle A4. According as the refrigerant is expelled from the absorption medium in the element A, the latter will be poorer in refrigerant causing the temperature of said element and of the refrigerant vapours escaping therefrom to become higher and higher. The heat of the copper sleeve 30 is transmitted to the thermostat 53 causing movable member 54 thereof to be moved forwards with the result that movable member 55 is brought into contact with stop 59 of lever 43. However, the magnet 51 keeps the armature 50 in attracted position whereby the lever 43 is maintained in one of its positions in which its end 48 rests against stop 49. According as the member 54 is moved forwards, spring 58 will be stretched, and when pin 56 attains one of its end positions in hole 57, the members 54 and 55 will be rigidly connected with each other. On account of the increased pressure of member 55 against the abutment 59, armature 50 connected with lever 43 will be released from magnet 51 causing the end 48 of lever 43 to be suddenly moved from stop 49 to stop 52. When the lever 43 moves as above described ratchet wheel 42 is rotated by the pawl 44 causing shaft 41 and toothed wheel 40 connected thereto to actuate pinion 39 whereby shaft 25 will be rotated. The ratio of transmission between pinion 39 and toothed wheel 40 is so chosen as to cause rotation of shaft 25 through a quarter of a revolution. When shaft 25 is rotated, rotary members 11 and 12 are also rotated causing the recesses 15 and 17 to be turned into a position opposite conduits B1 and B2. The hot liquid which was circulating through conduits G and H and space 63 of element A, will now after shifting circulate through a similar space 63 of element B causing expulsion of refrigerant from its absorption medium contained in said element, said refrigerant escaping in vapour state through conduit B3. In the manner above described the refrigerant vapours are condensed in cooling element 31 into liquid refrigerant which gives off its heat to the pipe conduits A3, C3 and D3 and fills conduits 35 and partially receptacle B4. By the shifting and by the rotation of the movable members 11 and 12 through a quarter of a revolution, element A has by the holes 13 and 14 been brought into direct communication with conduits C1 and C2 and through said conduits with element C. In this position element C is cold and element A hot whereby the circulating liquid in element A is lighter than that in element C causing said liquid to ascend in A through conduit A1, hole 13 and conduit C1 passing through space 63 of element C and thence through conduit C2, hole 14 and conduit A2 back to element A. In this manner element A gives off its heat by liquid circulation to element C causing A to be cooled and C to be heated. The liquid circulation or the cooling and heating can proceed until A and C have equal temperatures. When element A is cooled in the manner above described the vapour pressure of refrigerant falls in said element, and as all gases besides refrigerant vapours are removed from the apparatus when wholly or partially charging same with refrigerant, the vapour pressure in element A will be lower than in receptacle A4 and pipe conduits 34. This results in the refrigerant in receptacle A4 and pipe conduits 34 beginning to evaporate whereby heat is absorbed, said heat being taken from the surroundings of the refrigerator. The refrigerant vapours evaporated from receptacle A4 and pipe conduits 34 escape through A3 to the absorption medium in element A. The heat of absorption thereby formed is transmitted by liquid circulation from A to C. The heat of absorption in A will, consequently, be utilized for the expulsion of refrigerant vapours in C. One may say that element C cools element A or that A heats C. On account of the heating from element A the refrigerant vapours are expelled from C escaping through conduit C3 to cooling element 31. Thereby the refrigerant vapours are transferred into liquid state, the liquid refrigerant thence flowing into receptacle C4 and pipe conduits 36. It is to be observed that the expulsion of refrigerant from element C as above described takes place simultaneously with the heating of element B. At the beginning of this heating of elements B and C the copper sleeve 30 is partially cooled causing the movable members 54 and 55 to move backwards. The spring 45 has returned lever 43 and armature 50 into starting position in which the end 48 of lever 43 engages stop 49 so that the pawl 44 has again been brought into engagement with ratchet wheel 42.

By the continued heating of element B and on account of the increased temperature of the refrigerant vapours escaping from said element as a result of said heating, the temperature of the copper sleeve 30 will again increase, causing member 54 of the thermostat to move forwards and to release armature 50 from magnet 51 at maximal temperature of the element B as above described, thereby effecting a new shifting of the movable members 11 and 12 of the change over devices E and F, said members 11 and 12 thereby being turned through a quarter of a revolution. Now heat distributor L will be connected with element C. During the foregoing period this element C was heated to a temperature approximately equal to half the maximal increase of temperature on account of the absorption in element A. Consequently, the liquid from the heat distributor L will now circulate through element C causing said element to be heated to a maximal temperature as described above. During the foregoing period element A has given off its heat of absorption to element C and thereby been cooled. After the last-mentioned shifting in order to connect heat distributor L to element C element A will be coupled to cooling element 28 through conduits A1 and A2, recesses 16 and 18 spaces 20 and 22 and conduits I and J. As the liquid in element A is hotter than that in cooling element 28, said liquid will ascend through conduit I, be cooled in element 28 and returned to the lower portion of element A through conduit J and change over device F. By this liquid circulation element A will, consequently, be cooled down to a minimum value. When coupling the heat distributor L to element C, element B will in the manner described give off its heat to element D causing refrigerant contained in the latter to be expelled through conduit D3 and cooled to condensate in cooling element 31. The liquid condensate passes into receptacle D4 and pipe conduit 37 which are filled in the above-said manner. When on account of absorption of heat from the heat distributor L. element C has attained its maximum temperature, a new shifting is effected by the thermostat 53, the heat distributor L being now coupled to element D in which the refrigerant will now be expelled until a certain maximum temperature is attained. When said temperature is attained in element D the thermostat 53 effects a new shifting of the devices E and F, the heat distributor L being then again coupled to element A. As seen, the movable members of the change over devices E and F will be rotated through a quarter of a revolution each time the copper sleeve 30 and the thermostat 53 attain maximum temperature.

In continuous operation the apparatus will, consequently, operate as follows:

Heat distributor L, which is continuously heated by the heat source 1, will by liquid circulation heat element A causing refrigerant to be expelled from said element through conduit A3 and condensed in cooling element 31, the condensed refrigerant passing into the receptacle A4 and filling conduits 34 and part of said receptacle. Simultaneously with the heating of element A to maximum temperature element C is by conduits I and J connected with cooling element 28, said element C being by liquid circulation through cooling element 28 cooled down to minimum temperature, the absorption medium in said element absorbing refrigerant vapours through conduit C3 from receptacle C4 and pipe conduits 36. Simultaneously with the heating of A to maximum temperature and the cooling of C to minimum temperature element D will absorb refrigerant vapours through conduit D3 from receptacle D4 and pipe conduits 37. As the absorption in element D begins at maximum temperature and this element is connected with element B, element D will give off its heat of absorption to element B, refrigerant vapours being expelled from element B through conduit B2 beginning at minimum temperature, which vapours are condensed in cooling element 31 and flow down into receptacle B4 and pipe conduits 35. When the temperature in element A and pipe conduit A3 as well as copper sleeve 30 has attained its maximum value, the thermostat effects shifting of the change over devices E and F causing the heat distributor L to be coupled to cooling element B, element D to be coupled to cooling element 28 and elements A and C to be coupled together. Now B will be heated to maximum temperature and D cooled down to minimum temperature, the temperatures in A and C being equalized approximately to the same value. When the temperature in B has attained its maximum value, the change over devices E and F will again be shifted, the heat distributor L being now coupled to element C, whereas element A is connected to cooling element 28 and elements B and D coupled together resulting in an expulsion of refrigerant vapours from elements C and D and absorption of such vapours in elements B and A. By continued rotation of the members of the change over devices E and F a continuously repeated expulsion and absorption will take place in two adjacent elements. As the heat of absorption in one element is always utilized for the expulsion of refrigerant from the opposite element, approximately 50 per cent of the heat energy is saved in a refrigerating apparatus of the present type comprising four elements. Furthermore, since such elements in which absorption takes place are always cooled by elements from which refrigerant is expelled, no air or other cooling is required for taking up the heat of absorption during the period of equalization between said elements. Finally, as the apparatus operates without any inert gas which would cause losses and as the generator K is always well heat-insulated, a good heat economy will be attained.

Intermittently operating apparatus hitherto known operate as a rule with non-insulated generators during the period of expulsion. Furthermore, as the conduits A3—D3 within the insulation 33 are in good thermal contact with each other, the condensate of refrigerant flowing through two of the conduits A3 to D3, inclusive, from the cooling element 31 will always be cooled by refrigerant vapours from two of the receptacles A4 to D4, inclusive, causing condensate of refrigerant always to be supplied in cold state to two of the receptacles A4 to D4, inclusive, this under the presumption that in the conduits A3 to D3, inclusive, or in spaces adjacent thereto there is a small quantity of an inert gas, e. g., nitrogen, which prevents condensed refrigerant vapours from entering the receptacles A4 to D4, inclusive. By this means a saving of refrigeration is effected resulting in a decreased heat consumption. In the cooling element 31 cooling takes place on the one hand by the action of the surrounding air and on the other hand by means of interior cooling by cold vapours of refrigerant flowing through any of the conduits A3 to D3, inclusive, from the corresponding receptacle A4 to D4, inclusive.

In the foregoing description the principle of the invention and an embodiment of same have been described. The arrangements may be varied in several respects without departing from the scope of the invention, the essential feature of the invention residing in the fact that refrigerant from one or more elements is expelled by means of the heat of absorption obtained from one or more other elements or elements operating in the absorption stage and being cooled by elements in the stage of expulsion. For this reason the heat distributor L may be dispensed with and the elements A to D may each be provided with a heat source in the form of a gas flame, an electric heater or the like, said heat sources being thrown in and out simultaneously with the shifting of the different elements. Although a heat insulation of the elements will to a high degree diminish the heat consumption or increase the efficiency, the heat distributor L as well as the elements A to D may be non-insulated, in which case the cooling element 28 may be dispensed with, the action of said element being replaced by direct cooling of the elements A to D. However, in such case the efficiency will be less and for this reason the embodiment of Fig. 1 with insulated generator is to be preferred. When using electric heating no contact means of any kind are required according to this embodiment whereby any risk of failure of such contacts is eliminated. A continued ignition and extinction of gas flames is also unnecessary in this embodiment which, of course, involves great advantages.

The heat source need not necessarily consist of an electric heater, gas flame or the like but it may also consist of hot gases, e. g. air, circulating hot liquids or the like. The heat transmitting medium between the heat distributor L, elements A to D and cooling element 28 needs not consist of a circulating liquid having an invariable state of aggregation but it may also consist of a medium which is alternately evaporated and condensed. Instead of using four elements A to D, inclusive, as shown in Fig. 1, the number of elements may be reduced to two or increased, as desired. When using two elements A and B there is always a heating or expulsion period in A and a cooling or absorption period in B. Thereafter an equalization in temperature occurs between A and B, refrigerant being expelled from B by means of heat of absorption from A, and then a further heating and expulsion period occurs in B and a cooling and absorption period in A. In arrangements of this type having a special condition of equalization, there is, consequently, a period during which no heat source is coupled either to A or to B. According to the embodiment shown in Fig. 1, the heat distributor L as well as the elements A to D may be separated from each other with or without insulation.

According to Fig. 3 the solid absorption medium 8 is pressed into position between pipe conduit A3 and the wall of the receptacle 5. A good thermal contact is required between the wall and the absorption medium. For this reason it may be suitable to provide along the receptacle horizontal or vertical plates connected to the wall of the receptacle, thereby increasing the contact surface of the refrigerant vapours with the absorption medium. The change over devices E and F may, of course, be constructed in other manner, e. g. as valves or the like.

On account of the circulating liquid consisting of an oil, for example, a practically friction-free movement of the members 11 and 12 in the valve housings 9 and 10 is attained. Instead of the change over device including a magnet 51 and an armature 50 as shown in Fig. 8, a momentary action may be effected by means of a spring arranged between lever 43 and movable member 54 of the thermostat, said spring having at the beginning a tendency to maintain lever 43 and member 54 in abutting position. When member 54 moves forwardly, the position of the spring changes so as to move past shaft 41 about which lever 43 turns, causing an abrupt adjustment of the lever. Instead of one thermostat 53 the different cooling elements may each be provided with a thermostat, said thermostats actuating the change over device in their proper turns. However, the embodiment shown in Fig. 1 having a single thermostat is simpler.

In Figs. 9 to 16 some practical embodiments and details are shown which are not illustrated in the principal Figures 1 to 8. Figs. 17 to 20 are diagrammatical views illustrating the connections between the different elements or cooling systems during different stages of operation of the apparatus, when using four or more elements. Fig. 21 is a view of an embodiment of an element to be used for instance in large refrigerating plants.

In Fig. 9, which corresponds essentially to Fig. 1, the corresponding members are defined by the same designations as in the latter figure. According to Fig. 9, the thermostat 53 is disposed in a manner other than in Fig. 1, viz. in good thermal contact with the heat distributor L which, of course, attains marked minimum and maximum temperatures at the beginning and end of each period. The movable member 54 of the thermostat is by means of a lever 64 connected to the change over device within the cap 61, that is shaft 41, toothed wheel 40, etc. The engagement of the movable member 54 with lever 64 may be adjusted by a screw 65. In Fig. 9 cooling element 28 with ribs 29 is arranged approximately at the same level as elements A, B, C and D. In order to permit expansion of the heat transmitting circulating medium on heating the apparatus, an expansion vessel 66 is provided connected at its lower end by conduits 67 with the lower portion of the spaces 62 and 63 in the heat distributor L and the elements A to D, inclusive, as well as the cooling element 28. By pressure equalizing conduits 68 the upper end of the expansion vessel 66 is connected with the upper portion of the spaces 62 and 63 in the heat distributor, elements A to D, inclusive, cooling element 28 and the upper portion of pipe conduit 27. The dotted lines 69 designate a corner of a room to be cooled, e. g., in a domestic refrigerating apparatus, and the line 70 designates the limitation of an insulation arranged around the receptacles A4 to D4, inclusive. The elements A to D, inclusive, may preferably be supplied with solid absorption medium through pipe connections 71 at their lower end which connections may then be closed by welding.

In Fig. 10 reference numeral 72 designates a valve for filling the cold apparatus with refrigerant and circulating medium. 73 designates a screw having a tight fit in the valve by the aid of a packing 74 of aluminium, lead, copper or other suitable material. When the apparatus is to be filled, the screw 73 is screwed outward, and a nut, sleeve or the like is screwed onto the valve member as at 75 having a packing box serving to effect a tight fit of the screw 73. Evacuation and filling of the receptacles to which the valve has been connected may there take place through a conduit screwed into the opening 76.

According to Fig. 11 the upper portion of pipe 27 is so designed as to permit a practically tight fit of the shaft to which the pinion 39 is secured. For this reason the pinion 39 is secured to a shaft 77 provided with a conical member 78 fitting tightly in a sleeve 79 or the like which may be screwed onto pipe 27, a packing 80 serving to attain a tight fit of the sleeve on the pipe. At its lower end shaft 77 has a flat section engaging a recess 81 in shaft 25. A spring 82 serves to maintain conical member 78 pressed against sleeve 79.

According to Fig. 12 the elements, e. g., A to D, inclusive, are constructed in correspondence to element A diagrammatically shown in Fig. 3. In order to obtain a large contact surface between the absorption medium 8 and the refrigerant vapours expelled through or absorbed from conduit A3, said conduit is connected with a porous body 83 extending throughout the length of the element. Preferably, the porous body 83 may consist of wire netting, e. g. of iron, wound in such a manner as to form a central passage 84 which may be filled by porous material, e. g. iron wool, asbestos or the like. At its upper end the body 83 may be maintained in position by a sheet metal sleeve 85 and at its lower end by another sleeve 86, the latter being welded to the wall of the receptacle 5 by means of webs 87. In order to ensure that the porous body does not give away at its centre other webs 87 are provided at suitable places abutting against the interior of the receptacle 5. If necessary, the porous body 83 may either at its central portion or on its internal surface be provided with a special fine-meshed net-work preventing powder of absorption medium from entering the central space 84.

Fig. 13 shows a practical embodiment of a change over device corresponding to that illustrated principally in Figs. 4 to 7, e. g., Fig. 4. The valve housing 9 of said change over device is tubular and closed at its upper and lower ends by means of flanged lids 88 which may be secured by welding, soldering or the like. The inner movable member 11 is also tubular, and the passages 13, 15 and 16 are formed by sheet metal in such a manner as to reduce to a minimum the thermal connections between said passages. In order to effect large sectional areas of flow the passages are preferably square or rectangular in cross section. To prevent breaking of shafts 24 and 25 within the change over devices said shafts are not directly connected with the movable member 11 but indirectly by means of clutches formed with suitable plays as shown in the figure.

In Fig. 14 an arrangement is shown by means of which part of the specific heat contained in the cold vapours of refrigerant escaping from the refrigerator may be returned to the room to be cooled, e. g. the interior of a domestic cold cabinet. The outlet conduits A3 to D3, inclusive, from the receptacles A4 to D4 inclusive, are surrounded by lengthened containers or vessels 89 in good thermal exchangement, e. g. by means of internal ribs. Drawn from said vessels 89 are conduits 90 which are in direct or indirect thermal connection with the room or rooms to be cooled, e. g. in such a manner that the conduit 90 is provided with heat conducting ribs. Up to a suitable level the conduit 90 is filled by a medium having a low boiling point, e. g., ammonia, ether or the like, and for the rest the conduit is essentially free from other gases. When the container 89 is cooled by the cold vapours of refrigerant flowing through conduits A3 to D3, inclusive, the pressure within container 89 is reduced resulting in the medium in the lower portion of conduit 90 being evaporated while taking up heat from the surroundings and condensed in the container 89. By alternate evaporation and condensation of the enclosed medium in this manner heat is transmitted from the lower portion of conduit 90 to container 89, or, which is the same, the lower portion of conduit 90 and its surroundings are cooled by container 89 or the cold vapours of refrigerant flowing through conduits A3 to D3.

In Fig. 15 a practical embodiment of the thermostat 53 of Figs. 1 and 9 is shown, said thermostat being mounted on the container 4 of the heat distributor L. Fig. 16 is a cross sectional view of said thermostat and heat distributor. The heat sensible member of the thermostat is composed by a plurality of long metal plates of different coefficients of heat expansion, e. g., metal plates of a nickel iron alloy of 36 per cent Ni available on the market under the name of invar-metal, and plates having a high coefficient of heat expansion, e. g., brass or a nickel iron alloy of 27 per cent Ni with an addition of molybdenum which is used when an especially high heat expansion is desired. If invar and brass are used the thermostat may be built up in the following manner. A plate of invar is secured as at 91, e. g. by soldering, welding or screwing. Secured to the lower portion 92 of said plate by soldering, welding or the like is a plate of brass connected at its upper end 93 to a second plate of invar which at its lower end 94 is connected to a second plate of brass etc. The outermost plate 95 consists of brass and is connected to the rod 54 which in the manner previously described co-operates with the lever 64, the engagement between said rod and lever being controlled by the screw 65. The individual invar and brass plates should bear tightly on each other which may be effected by a spring 96 and an intermediate metal bar 97. The thermostat may be secured to the container 4, e. g. by bent metal bars 98 or by soldering. When the thermostat is heated, the brass plates will undergo a greater expansion than the invar plates, the linear expansions of the individual brass plates being added to each other, the resultant actuating the rod 54. In order to ensure an easy sliding motion of the brass plates against the invar plates the interior of the thermostat may be filled by graphite, oil or the like. A spirally bent so called bi-metal band may also be used as heat sensible member.

Fig. 17 shows diagrammatically how the four elements may be coupled to each other, to the heat distributor and to the cooling element in different stages of operation of the apparatus. The double circles designate that the elements are subjected to expulsion and the single circles that they are under absorption. The numerals within the circles designate the temperature value of the element in relation to the maximum and minimum temperatures. The reference letter E together with the arrows close by two elements of each group designate that energy is either supplied to the element from the heat distributor or removed from same to the cooling element. The dotted arrows between two elements designate that transmission of energy or temperature equalization takes place between two elements. The change over device shown diagrammatically at the centre of Fig. 17 shows the number of channels required for the coupling together of the different elements. As seen from the figure when using four elements it is only necessary to utilize the heat distributor for increasing the temperature of the expulsion element up to maximum temperature from a temperature value equal to half said maximum temperature and to utilize the cooling element for cooling the absorption element down to minimum temperature from a temperature value equal to half the maximum temperature.

In Fig. 18 the same reference designations are used to show the manner of effecting shifting of the individual elements when using eight elements or cooling systems. As seen from the figure it is only necessary to supply one fourth of the maximum amount of energy, that is it is only necessary to utilize the heat distributor for heating the expulsion element up to maximum temperature from a temperature value equal to three-fourths of said temperature and remove one-fourth of the maximum amount of energy from the absorption element. The change over device shown diagrammatically at the right of Fig. 19 illustrates the expulsion and absorption stages required for the shifting as well as the different coupling conditions, when using sixteen elements or cooling systems. According to the left part of Fig. 19, the heat distributor need only supply to the expulsion element one-eighth of the maximum amount of energy and the cooling element needs only be made use of for one-eighth of said amount. When using $n$ elements, the theoretical supply of energy will be equal to twice the maximum amount of energy divided by $n$ and the number of passages in the change over device will be equal to $$\frac{n}{2}-1$$

besides inlet and outlet channels for energy supply and cooling.

According to Figs. 17 to 19, inclusive, the individual groups of elements are coupled in parallel. Fig. 20 shows how the different elements or cooling systems may also be coupled in series, for the sake of simplicity only four elements A, B, C and D being shown with appurtenant conduits A3, B3, C3 and D3, a common condenser 31, collecting receptacles A4, B4, C4 and D4 and refrigerator conduits 34, 35, 36 and 37, all in accordance with Figs. 1 and 9 and other corresponding figures.

In Fig. 21 a practical construction of an element is shown by way of example. Arranged within a container 99 with a tight fit are two partitions 100 and 101 and disposed between said partitions are a plurality of cooling pipes 102. Inserted in holes in an additional partition 103 mounted within the container are a plurality of porous bodies 83 formed by network of suitable size and filled internally by iron wool or other porous material, the space 104 being also filled by such material. At each end of the container the cooling pipes 102 open into a free space 105 and 106, respectively, to which the conduits A1 to D1, inclusive, and A2 to D2, inclusive, are connected in accordance with the above description of Figs. 1, 3 and 9. According to Fig. 20 conduits A1 to D1, inclusive, and A2 to D2, inclusive, are connected with a common change over device having an outer valve housing 107 and an internal movable member 108 provided with recesses and passages permitting connection of the different elements or cooling systems with each other in various combinations. The two supply conduits 109 and 110 of the cooling element 28 are by means of separate connecting members (which preferably are conical in order to effect an improved tight fit) permanently connected with the channels 111 and 112, and the inlet and outlet conduits 113 and 114 of the heat distributor L are in similar manner, by means of separate connecting members, connected with the channels 115 and 116. Inserted in conduit 110 is a pump 117, e. g., a motor driven toothed wheel pump, centrifugal pump or the like. The interior of each of the elements A, B, C and D is, as before, filled by an absorption medium 8, e. g., calcium chloride, in which a suitable refrigerant e. g., ammonia, is absorbed, said refrigerant filling also to a suitable degree the refrigerator pipes 34 to 37, inclusive. The outer spaces 105 and 106, cooling pipes 102 and appurtenant conduits A1 to D1, inclusive, and A2 to D2, inclusive, as well as the expansion vessel 66 and appurtenant conduits and spaces are to a suitable degree filled by a circulating medium, e. g., an oil having a high boiling point. When the pump 117 is started, the circulating medium is circulated, e. g., in the direction of the arrow shown in conduit 110. The circulating or heat transmitting medium, called the oil in the following description, flows in cooled condition from element 28 into cooling pipes 102 of element C causing said element to be cooled and brought into stage of absorption at minimum temperature. The oil flows further through conduits C1 and D2 to element D which is brought into stage of absorption but at a higher temperature. The oil continues its flow through conduits D1 and 113 to the heat distributor L in which it is heated in countercurrent, e. g., by an oil flame, electric heater or the like as shown at 1. The heated oil passes then through conduit 114, change over device and conduit A1 to element A which is brought into stage of expulsion to maximum temperature. After having given off part of its heat content the oil passes through conduit A2, change over device and conduit B1 to element B which is also brought into stage of expulsion but at a lower temperature. Then the oil flows back through conduit B2 and the change over device, conduit 109 to cooling element 28 in which it is cooled. When element A which is in stage of expulsion has attained maximum temperature, movable member 108 is shifted in the direction of the arrow, e. g., by the action of a thermostat, preferably connected with the heat distributor L or any conduit appurtenant thereto, directly or indirectly by the action of an engine of suitable kind, causing conduits 113 and 114 of the heat distributor to be connected with element B and conduits 109 and 110 of cooling element 28 to be directly connected with element D. By the continued circulation of the oil element D is still maintained in stage of absorption but to minimum temperature and element A also in stage of absorption but from a higher temperature. Element B is still brought into stage of expulsion but up to maximum temperature and simultaneously element C is shifted into stage of expulsion but from minimum temperature. When element B has attained maximum temperature the movable member 108 is again shifted etc. Thus, the different elements A, B, C and D are alternately brought into stage of absorption and stage of expulsion, the operation of the system being the same as that described with reference to Figs. 1 and 9. As stated above with reference to Figs. 17 and 19, inclusive, an arbitrary number of elements or cooling systems other than four as shown in Fig. 20 may be coupled in series. In all embodiments shown the shifting of the different elements into stages of absorption and expulsion may be effected by a member directly or indirectly actuated by a thermostat by means of a suitable engine. However, shifting may also be effected in other manner, e. g., periodically by means of a time switch or even manually.

In the series arrangement shown in Fig. 20 the circulating or heat transmitting medium may also consist of a gas, for instance air, or a medium which is alternately evaporated and condensed or which is circulated by means of differences in specific weight in ascending and descending conduits or by pump action according to the thermosiphon principle, etc. The cooling of the condenser or the different elements may, of course, instead of by air, be effected by water or by a combination of air and water cooling, if desired in combination with evaporation of a secondary medium, e. g., water which is caused to sprinkle down over the condenser and/or the cooling elements. The transmission of the cold produced to the room to be cooled may take place in any suitable manner by means of media circulating according to known principles, or the room may be cooled directly by the refrigerator pipes. Elements, especially for large plants, should have a great contact surface between the absorption medium and the vapours expelled or absorbed, and it is also necessary to effect rapid heating and cooling of the absorption medium. For this reason a great plurality of porous bodies or cooling pipes should be arranged in parallel within the interior of the elements, which cooling pipes may, of course, be combined with jacket cooling in the manner shown in Fig. 3. In order to attain great surfaces the absorption medium, porous bodies and cooling pipes or cooling receptacles may be arranged in thin parallel layers in the same manner as the plates in an electric accumulator. In each group two or more elements may, of course, be coupled in parallel. In order to impart a suitable rotary movement to the cooling medium in the cooling pipes, spirally bent bands or plates may be provided in said pipes whereby the cooling action is increased.

In the above description, methods of producing cold and refrigerating apparatus are referred to as operating with absorption. Although the absorption principle necessarily must be utilized in order to attain high cooling outputs, high efficiencies and smallest possible dimensions of the apparatus capable of being produced at low costs, the invention may also be applied to apparatus operating with adsorption. However, the above-said technical and other advantages are only attained when applying the absorption principle and, to a special high degree, in such cases where within the elements the absorption is combined with chemical reaction between the refrigerant and the absorption medium, as is the case when using e. g. ammonia and calcium chloride.

The following additional advantages may be attained according to the invention. The different elements may be formed as separate systems which may be made entirely gas-tight by means of welding. Each system may be made fully open, e. g., between the expulsion and absorption elements and the refrigerator, and as the medium or media circulating through the open system are in the form of vapour, any risk of stoppage is eliminated which would result in the apparatus being set out of function. In the closed system in which the media move, e. g., periodically, there are no valves which may easily become leaky rendering it impossible to obtain reliable functioning of absorption and adsorption apparatus or a continuous operation of compression refrigerating apparatus causing in course of time a reduction of the efficiency of said apparatus. Thus, the invention allows construction of refrigerating apparatus which as far as low cost of installation and low working expenses are concerned, especially when running with crude oil or coal, are superior even to compression refrigerating apparatus but which in contradistinction to such apparatus have no movable parts within the systems whereby all costs of maintenance are practically eliminated. As stated above the different elements may be coupled either in parallel or in series, but the present principle may, of course, also be carried out by a combination thereof without departing from the scope of the invention, that is by parallel and/or series connection of groups of elements, the elements in each group being coupled either in parallel or in series.

As refrigerant there may be used, besides ammonia, other suitable volatile substances, e. g. amines or organic substances having a somewhat higher boiling point. The refrigerant may consist either of a single substance or of a combination of several substances. As absorption medium there may be used, instead of calcium chloride, other halogen compounds of calcium or halogen compounds of barium, strontium and lithium and also zinc, nickel and cobalt, magnesium, manganese, lead or mixtures of these substances. Also more or less liquid or semi-liquid substances may be used as absorption medium, e. g., rhodanites and rhodanates, cyanides, nitrites and nitrates etc.

The refrigerator may also be arranged as a so called resorber with an absorption medium suitable for this purpose, e. g. a magnesium containing halogen compound.

In mounting the apparatus in combination with a domestic cold cabinet the temperature within the cabinet may, of course, be controlled to any suitable degree, e. g., by means of a thermostat which starts and cuts out or increases or decreases the heat source. When using an electric heater as heat source, the contact device thereof may consist of a so called mercury switch. In such cases where neither gas nor electricity is available, an ordinary kerosene burner may be used having either an ordinary wick or built according to the blue flame principle. Heat energy required for a domestic cold cabinet may also be delivered by a stove or the like, preferably a permanent burning, so called accumulating stove, the heat from the stove being preferably transmitted by means of a medium which is circulated in the manner above described or is alternately evaporated and condensed.

What I claim is:—

1. In refrigerating apparatus of the absorption type, the combination of a plurality of generator-absorber elements charged with a material capable of expelling and absorbing a refrigerant upon being heated and cooled, respectively, means for transferring heat of absorption from each of said elements to certain of the others to effect partial expulsion of the refrigerant therefrom, and a separate source of heat for supplementing the heat of absorption thus transferred to each element to effect further expulsion of the refrigerant therefrom.

2. In refrigerating apparatus of the absorption type, the combination of a plurality of generator-absorber elements charged with a material capable of expelling and absorbing a refrigerant upon being heated and cooled, respectively, a source of heat, a cooling device, and means for so connecting each of said generator-absorber elements successively with another of said elements which is in condition to absorb refrigerant, the heating source, one of said elements which is in condition to expel refrigerant and the cooling device as to effect a heat exchange therebetween, whereby the heat of absorption from each element is utilized for effecting partial expulsion of refrigerant from another element.

3. Refrigerating apparatus according to claim 2, wherein each of the elements after having given off heat of absorption for the expulsion of refrigerant is adapted to be then so connected to the cooling device as to give off further heat of absorption to the surrounding air.

4. Refrigerating apparatus according to claim 2, wherein each of the elements after having had refrigerant expelled therefrom by heat of absorption from another of said elements is adapted to be then so connected to the heat source as to receive additional heat for further expulsion of refrigerant.

5. Refrigerating apparatus according to claim 1, wherein the element in the stage of absorption gives off its heat of absorption to another element in the stage of expulsion by means of a circulating heat transmitting medium.

6. Refrigerating apparatus according to claim 1, wherein the element in which heat is absorbed by expulsion of refrigerant is adapted to take up heat from another element in which absorption takes place by means of a circulating heat transmitting medium.

7. Refrigerating apparatus according to claim 2, wherein each of the elements after having given off heat of absorption to another of said elements for expulsion of refrigerant is further cooled by a circulating heat transmitting fluid medium which is alternately evaporated by the heat of absorption and condensed in said cooling device.

8. Refrigerating apparatus according to claim 2, wherein the heat transmission from the heat source to elements from which expulsion of refrigerant is to be effected by means of said heat source takes place by means of a circulating heat transmitting fluid medium which is alternately evaporated and condensed.

9. Refrigerating apparatus according to claim 2 containing four or more generator-absorber elements, wherein the connections between said elements, the heating source and the cooling device are so arranged that expulsion of refrigerant and heating to maximum temperature in one of the elements takes place simultaneously with absorption and cooling to minimum temperature in another element and with an exchange of heat between the other elements by absorption and cooling on one group and expulsion and heating in another group.

10. Refrigerating apparatus according to claim 2 containing two generator-absorber elements, wherein said elements are connected with each other, the heating source and the cooling device in such a manner that one element in the stage of expulsion is heated to maximum temperature by said heating source simultaneously with the cooling to minimum temperature by said cooling device of the second element in the stage of absorption, after which an exchange of heat takes place between the elements, the refrigerant in the second element being expelled by the heat of absorption from the first element.

11. Refrigerating apparatus according to claim 1, including change over means for successively coupling said separate source of heat to the respective generator-absorber elements.

12. Refrigerating apparatus according to claim 1, wherein the heat transmission between the separate heat source and the respective generator-absorber elements takes place by means of a circulating fluid medium.

13. Refrigerating apparatus according to claim 1, wherein the separate heat source and the respective generator-absorber elements are insulated.

14. In refrigerating apparatus of the absorption type, the combination of a plurality of generator-absorber elements charged with a material capable of expelling and absorbing a refrigerant upon being heated and cooled, respectively, a source of heat, a cooling device, a chamber associated with each of said generator-absorber elements, a circulating heat transmitting medium in said chambers, a valve housing, conduits connecting all of said chambers, said heat source and said cooling device to said housing, and a rotatable valve member within said housing so constructed and arranged as to connect each of said chambers successively with another of said chambers associated with a generator-absorber element which is in condition to absorb refrigerant, the heating source, one of said chambers associated with a generator-absorber element which is in condition to expel refrigerant and said cooling device.

15. Refrigerating apparatus according to claim 14, including a shaft for controlling the movements of said valve member, said shaft being mounted within a pipe extending upwardly from said valve housing to such a height as to reach above the highest point of said apparatus.

16. Refrigerating apparatus according to claim 1, wherein the source of heat comprises a heat channel in which a heating element may be inserted, said channel being surrounded by a shell closed at both ends and provided at its upper and lower ends with outlet and supply conduits.

17. Refrigerating apparatus according to claim 1, wherein each of the generator-absorber elements consists of a lengthened container surrounded by a shell closed at both ends and communicating at its upper and lower ends with inlet and outlet conduits, said container having at least one perforated outlet conduit for refrigerant vapours extending therethrough.

18. In refrigerating apparatus of the absorption type, the combination of a plurality of generator-absorber elements charged with a material capable of expelling and absorbing a refrigerant upon being heated and cooled, respectively, a source of heat, a cooling device, a chamber associated with each of said generator-absorber elements, a circulating heat transmitting medium in said chambers, a valve housing, conduits connecting all of said chambers, said heat source and said cooling device to said housing, a rotatable valve member within said housing so constructed and arranged as to connect each of said chambers successively with another of said chambers associated with a generator-absorber element which is in condition to absorb refrigerant, the heating source, one of said chambers associated with a generator-absorber element which is in condition to expel refrigerant and said cooling device, and means including a thermostat for controlling the rotational movements of said valve member, said thermostat being in thermal connection with a member of the apparatus the temperature of which varies in accordance with expulsion and absorption.

19. In refrigerating apparatus of the absorption type, the combination of a plurality of generator-absorber elements charged with a material capable of expelling and absorbing a refrigerant upon being heated and cooled, respectively, a source of heat, a cooling device, a chamber associated with each of said generator-absorber elements, a circulating heat transmitting medium in said chambers, a valve housing, conduits connecting all of said chambers, said heat source and said cooling device to said housing, a rotatable valve member within said housing so constructed and arranged as to connect each of said chambers successively with another of said chambers associated with a generator-absorber element which is in condition to absorb refrigerant, the heating source, one of said chambers associated with a generator-absorber element which is in condition to expel refrigerant and said cooling device, and means for controlling the rotational movements of said valve member comprising a thermostat in thermal connection with a member of the apparatus the temperature of which varies in accordance with expulsion and absorption, a lever drivingly connected to said rotatable valve member through a ratchet wheel, means associated with the thermostat for moving said lever in one direction to rotate said valve member, an armature carried by said lever, and means including a magnet associated with said armature for resisting said movement until maximum temperature of the thermostat is attained.

20. Refrigerating apparatus according to claim 18, wherein the thermostat actuates a ratchet wheel which in turn actuates the rotatable valve member, the latter and said ratchet wheel being so constructed that the valve member rotates through a distance from the conduits connecting the chamber associated with one element to the conduits connecting the chamber associated with another element while the ratchet wheel rotates through one step.

21. Refrigerating apparatus according to claim 18, wherein the thermostat actuates a ratchet wheel connected to said rotatable valve member by means of a lever adapted to be moved by the thermostat.

22. Refrigerating apparatus according to claim 18, wherein the movements of said thermostat are adapted to momentarily actuate said rotatable valve member at a given maximum temperature of said thermostat.

23. Refrigerating apparatus according to claim 19, including two adjustable stop members for limiting the movement of the lever.

24. Refrigerating apparatus according to claim 19, wherein the movable member of the thermostat actuates the lever indirectly by means of a secondary movable member.

25. Refrigerating apparatus according to claim 19, wherein the primary movable member of the thermostat actuates the lever by means of a secondary movable member which is kept in position in the primary member by means of a spring.

26. Refrigerating apparatus according to claim 19, wherein the primary movable member of the thermostat actuates the lever by means of a secondary movable member the movement of which in relation to the primary member of the thermostat is limited by two stops.

27. Refrigerating apparatus according to claim 1, wherein each generator-absorber element is connected to a separate refrigerator receptacle, said receptacles being separately connected with conduits which enclose boxes in which ice is formed.

28. Refrigerating apparatus according to claim 1, wherein the transfer of heat between said generator-absorber elements and said heat source is effected by means of a circulating heat transmitting medium which is alternately evaporated and condensed.

29. A method of producing refrigeration on the absorption principle which comprises extracting heat from one generator-absorber element charged with a material capable of absorbing and expelling refrigerant when cooled and heated, respectively, and transferring the heat of absorption thus obtained to a like generator-absorber element to effect partial expulsion of refrigerant therefrom, supplying an additional amount of heat to the latter element from an independent source to effect further expulsion of the refrigerant while simultaneously and independently continuing the cooling of said first mentioned element to effect further absorption therein, and then reversing the procedure by commencing cooling of said second mentioned element and transfer of the heat of absorption therefrom to said first mentioned element.

30. The method of producing refrigeration according to claim 29, wherein the heat transfer involved in all of said heating and cooling steps is effected by the circulation of one and the same fluid heat transmitting medium.

31. The method of producing refrigeration according to claim 29, wherein the heat transfer involved in all of said heating and cooling steps is effected by alternate evaporation and condensation of a one and the same fluid heat transmitting medium.

32. In refrigerating apparatus of the absorption type, the combination of a plurality of generator-absorber elements charged with a material capable of expelling and absorbing a refrigerant upon being heated and cooled, respectively, a source of heat, a cooling device, a chamber associated with each of said generator-absorber elements, a circulating heat transmitting medium in said chambers, a valve housing, conduits connecting all of said chambers, said heat source and said cooling device to said housing, a rotatable valve member within said housing so constructed and arranged as to connect each of said chambers successively with another of said chambers associated with a generator-absorber element which is in condition to absorb refrigerant, the heating source, one of said chambers associated with a generator-absorber element which is in condition to expel refrigerant and said cooling device, and means including a thermostat for controlling the rotational movements of said valve member, said thermostat being in thermal connection with said heat source which is successively connected to the chambers associated with said elements to heat same to maximal temperature.

AXEL UNO SÄRNMARK.